(12) United States Patent
Matsubara et al.

(10) Patent No.: US 11,980,951 B2
(45) Date of Patent: May 14, 2024

(54) CUTTING INSERT

(71) Applicant: Sumitomo Electric Hardmetal Corp., Itami (JP)

(72) Inventors: Kouki Matsubara, Itami (JP); Shota Takemura, Itami (JP); Tomoyuki Fukuyama, Itami (JP); Shota Tsujimoto, Itami (JP); Naoki Matsuda, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 426 days.

(21) Appl. No.: 17/442,615

(22) PCT Filed: Mar. 13, 2020

(86) PCT No.: PCT/JP2020/011203
§ 371 (c)(1),
(2) Date: Sep. 24, 2021

(87) PCT Pub. No.: WO2020/195976
PCT Pub. Date: Oct. 1, 2020

(65) Prior Publication Data
US 2022/0168825 A1 Jun. 2, 2022

(30) Foreign Application Priority Data
Mar. 27, 2019 (JP) .................. 2019-060279

(51) Int. Cl.
*B23C 5/20* (2006.01)
*B23C 5/10* (2006.01)

(52) U.S. Cl.
CPC ............. *B23C 5/109* (2013.01); *B23C 5/202* (2013.01); *B23C 2200/0416* (2013.01);
(Continued)

(58) Field of Classification Search
CPC ............. B23C 5/202; B23C 2200/0411; B23C 2200/083; B23C 2200/085;
(Continued)

(56) References Cited

U.S. PATENT DOCUMENTS 5,593,255 A * 1/1997 Satran ................. B23C 5/109
407/116
6,142,716 A * 11/2000 Jordberg ............. B23C 5/202
407/115
(Continued)

FOREIGN PATENT DOCUMENTS

JP 11-333616 A 12/1999
JP 2000-84708 A 3/2000
(Continued)

Primary Examiner — Sara Addisu
(74) Attorney, Agent, or Firm — XSENSUS LLP

(57) ABSTRACT

A cutting insert of the present disclosure includes a top surface, a bottom surface, a side surface, and a corner cutting edge, a first cutting edge, a second cutting edge and a third cutting edge formed at a ridge line formed by the side surface and the top surface. The corner cutting edge has a first end and a second end. The first cutting edge extends from the first end in a first direction. The second cutting edge extends from the second end in a second direction. The third cutting edge extends from the second cutting edge in a third direction. The top surface has a first rake face adjacent to the first cutting edge, a second rake face adjacent to the second cutting edge, and a third rake face adjacent to the third cutting edge.

10 Claims, 9 Drawing Sheets

(52) U.S. Cl.
CPC ............... *B23C 2200/0494* (2013.01); *B23C 2200/085* (2013.01); *B23C 2200/208* (2013.01); *B23C 2200/287* (2022.02); *B23C 2200/365* (2013.01)

(58) Field of Classification Search
CPC ........ B23C 2200/203; B23C 2200/208; B23C 2200/287; B23C 2200/291; B23C 2200/365; B23C 5/109; B23C 2200/286; B23C 2200/164; B23C 2200/0494; B23B 27/1607
See application file for complete search history.

(56) References Cited

U.S. PATENT DOCUMENTS

| | | | | |
|---|---|---|---|---|
| 6,196,770 | B1 * | 3/2001 | Astrom | B23C 5/109 407/43 |
| 7,004,689 | B2 * | 2/2006 | DeRoche | B23C 5/109 407/67 |
| 7,040,844 | B1 * | 5/2006 | Daiguji | B23C 5/2213 407/113 |
| 7,281,884 | B2 * | 10/2007 | Maeda | B23C 5/109 407/42 |
| 10,512,975 | B2 * | 12/2019 | Roman | B23C 5/109 |
| 2006/0013661 | A1 * | 1/2006 | Long, II | B23C 5/2213 407/113 |
| 2007/0031200 | A1 | 2/2007 | Maeda | |
| 2013/0045061 | A1 * | 2/2013 | Ishi | B23C 5/202 407/100 |
| 2013/0108388 | A1 * | 5/2013 | Ishi | B23C 5/109 407/113 |
| 2013/0115022 | A1 * | 5/2013 | Ishi | B23C 5/202 407/100 |
| 2017/0008099 | A1 * | 1/2017 | Touma | B23C 5/109 |
| 2017/0304911 | A1 * | 10/2017 | Kumoi | B23C 5/20 |
| 2019/0210124 | A1 * | 7/2019 | Slusarcyk | B23C 5/109 |
| 2019/0283149 | A1 * | 9/2019 | Touma | B23C 5/20 |
| 2020/0361010 | A1 * | 11/2020 | Ishi | B23C 5/205 |
| 2023/0132425 | A1 * | 5/2023 | Nishikoori | B23C 5/109 407/113 |
| 2023/0278115 | A1 * | 9/2023 | Kakai | B23C 5/109 407/113 |
| 2023/0294183 | A1 * | 9/2023 | Nishikoori | B23C 5/06 409/131 |

FOREIGN PATENT DOCUMENTS

| | | |
|---|---|---|
| JP | 2007-44779 A | 2/2007 |
| WO | 99/56903 A1 | 11/1999 |
| WO | 00/13830 A1 | 3/2000 |
| WO | WO-2016060195 A1 * | 4/2016 ............ B23C 5/109 |
| WO | WO-2020196526 A1 * | 10/2020 ......... B23B 27/1611 |

* cited by examiner

CUTTING INSERT

CROSS-REFERENCE TO RELATED APPLICATIONS

The present application is based on PCT filing PCT/JP2020/011203, filed Mar. 13, 2020, which claims priority to JP 2019-060279, filed Mar. 27, 2019, the entire contents of each are incorporated herein by reference.

TECHNICAL FIELD

The present disclosure relates to a cutting insert.

BACKGROUND ART

PTL 1 (Japanese Patent Laying-Open No. 2007-044779) describes an indexable insert. The indexable insert described in Japanese Patent Laying-Open No. 2007-044779 has a major cutting edge and a minor cutting edge.

Cutting with the indexable insert described in Japanese Patent Laying-Open No. 2007-044779 is performed by causing the major cutting edge to cut into a side wall surface of a workpiece and causing the minor cutting edge to cut into a bottom wall surface of the workpiece.

CITATION LIST

Patent Literature

PTL 1: Japanese Patent Laying-Open No. 2007-044779

SUMMARY OF INVENTION

A cutting insert of the present disclosure includes a top surface, a bottom surface opposite to the top surface, a side surface contiguous to the top surface and the bottom surface, and a corner cutting edge, a first cutting edge, a second cutting edge and a third cutting edge formed at a ridge line formed by the side surface and the top surface. The corner cutting edge has a first end and a second end opposite to the first end in a top view. The first cutting edge extends from the first end in a first direction in the top view. The second cutting edge extends from the second end in a second direction intersecting the first direction in the top view. The third cutting edge extends from the second cutting edge in a third direction forming an acute angle with the second direction in the top view. The top surface has a first rake face located adjacent to the first cutting edge, a second rake face located adjacent to the second cutting edge, and a third rake face located adjacent to the third cutting edge. The first, second and third rake faces form first, second and third rake angles, respectively, with a reference plane parallel to the bottom surface, and the first rake angle is larger than the third rake angle and the third rake angle is larger than the second rake angle.

DETAILED DESCRIPTION

Figure 1:
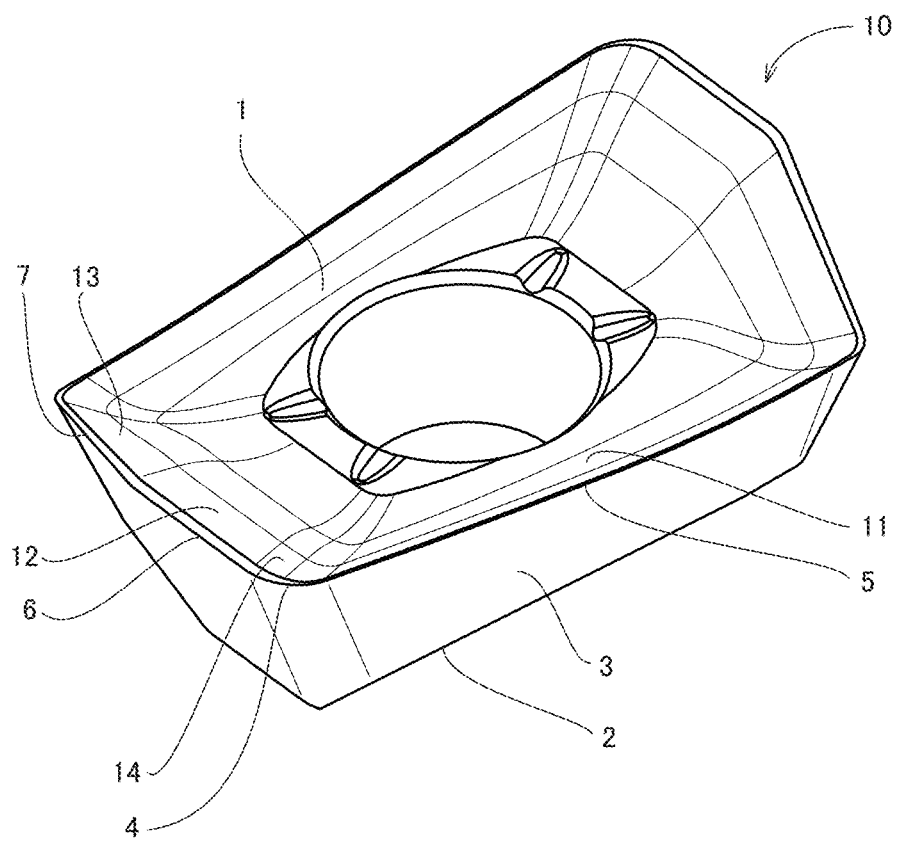
FIG. 1 is a perspective view of a cutting insert 10.

Problem to be Solved by the Present Disclosure

PTL 1 does not provide any specific disclosure for the indexable insert regarding controlling in which direction chips generated by the cutting edge are ejected.

An object of the present disclosure is to provide a cutting insert capable of controlling chips generated by a cutting edge to be ejected in an appropriate direction.

Advantageous Effect of the Present Disclosure

The presently disclosed cutting insert can control in which direction chips generated by a cutting edge are ejected, as appropriate.

Description of Embodiments

Initially, embodiments of the present disclosure will be enumerated and described.

A cutting insert according to one embodiment includes a top surface, a bottom surface opposite to the top surface, a side surface contiguous to the top surface and the bottom surface, and a corner cutting edge, a first cutting edge, a second cutting edge and a third cutting edge formed at a ridge line formed by the side surface and the top surface. The corner cutting edge has a first end and a second end opposite to the first end in a top view. The first cutting edge extends from the first end in a first direction in the top view. The second cutting edge extends from the second end in a second direction intersecting the first direction in the top view. The third cutting edge extends from the second cutting edge in a third direction forming an acute angle with the second direction in the top view. The top surface has a first rake face located adjacent to the first cutting edge, a second rake face located adjacent to the second cutting edge, and a third rake face located adjacent to the third cutting edge. The first, second and third rake faces form first, second and third rake angles, respectively, with a reference plane parallel to the bottom surface, and the first rake angle is larger than the third rake angle and the third rake angle is larger than the second rake angle.

The above cutting insert can control chips generated by a cutting edge to be ejected in an appropriate direction. More specifically, the above cutting insert has an increased first rake angle, and chips generated by the first cutting edge are easily ejected to a side opposite to a surface processed by the first cutting edge. Accordingly, the above cutting insert is less likely to bite the chips with the surface processed by the first cutting edge. Furthermore, the above cutting insert has a third rake angle larger than a second rake angle, and chips generated by the third cutting edge are easily ejected in a direction avoiding the second rake face. Thus the above cutting insert prevents chips generated by the third cutting edge from easily tangling with chips generated by another cutting edge.

In the above cutting insert, the top surface may further have a fourth rake face adjacent to the corner cutting edge.

In the above cutting insert, the fourth rake face may include a first surface contiguous to the first rake face, and a second surface contiguous to the first surface and the second rake face. In a cross section transverse to the first cutting edge and the second cutting edge, the first surface may have a curved shape concaved in a direction from the top surface toward the bottom surface. In the cross section transverse to the first cutting edge and the second cutting edge, the second surface may have a curved shape convexed in a direction from the bottom surface toward the top surface. In that case, chips generated by the first cutting edge are easily ejected in a direction avoiding the fourth rake face, and are hence less likely to tangle with chips generated by another cutting edge.

In the above cutting insert, the second direction and the third direction may form an angle of not less than 5° and not more than 45°.

In the above cutting insert, the second direction and the third direction may form an angle of not less than 15° and not more than 35°.

In the above cutting insert, the first cutting edge may be inclined so as to approach the bottom surface as the first cutting edge is farther away from the first end.

In that case, chips generated by the first cutting edge are easily ejected in a direction avoiding the fourth rake face, and are hence further less likely to tangle with chips generated by another cutting edge.

In the above cutting insert, the first cutting edge and the reference plane may form an angle of not less than 2° and not more than 20° in a side view observed in the second direction.

In the above cutting insert, the first cutting edge and the reference plane may form an angle of not less than 5° and not more than 15° in the side view observed in the second direction.

In the above cutting insert, the third cutting edge may be inclined so as to approach the bottom surface as the third cutting edge is farther away from the second cutting edge. In that case, chips generated by the third cutting edge are further easily ejected in a direction avoiding the second rake face. Thus, chips generated by the third cutting edge are further less likely to tangle with chips generated by another cutting edge.

In the above cutting insert, the third cutting edge and the reference plane may form an angle of not less than 10° and not more than 40° in a side view observed in the first direction.

In the above cutting insert, the third cutting edge and the reference plane may form an angle of not less than 15° and not more than 30° in the side view observed in the first direction.

Details of Embodiment of the Present Disclosure

Hereinafter reference will be made to the drawings to describe embodiments of the present disclosure more specifically. In the figures, identical or equivalent components are identically denoted and will not be described repeatedly.

Configuration of Cutting Insert According to Embodiment

Hereinafter, a configuration of a cutting insert according to an embodiment (hereinafter, referred to as a "cutting insert 10") will be described.

FIG. 1 is a perspective view of cutting insert 10. As shown in FIG. 1, cutting insert 10 has a top surface 1, a bottom surface 2, and a side surface 3. Bottom surface 2 is opposite to top surface 1. Side surface 3 is contiguous to top surface 1 and bottom surface 2. Cutting insert 10 is formed for example of cemented carbide.

Cutting insert 10 has a corner cutting edge 4, a first cutting edge 5 (a major cutting edge), a second cutting edge 6 (a flat drag), and a third cutting edge 7 (a minor cutting edge). Corner cutting edge 4, first cutting edge 5, second cutting edge 6, and third cutting edge 7 are formed at a ridge line formed by top surface 1 and side surface 3.

Figure 2:
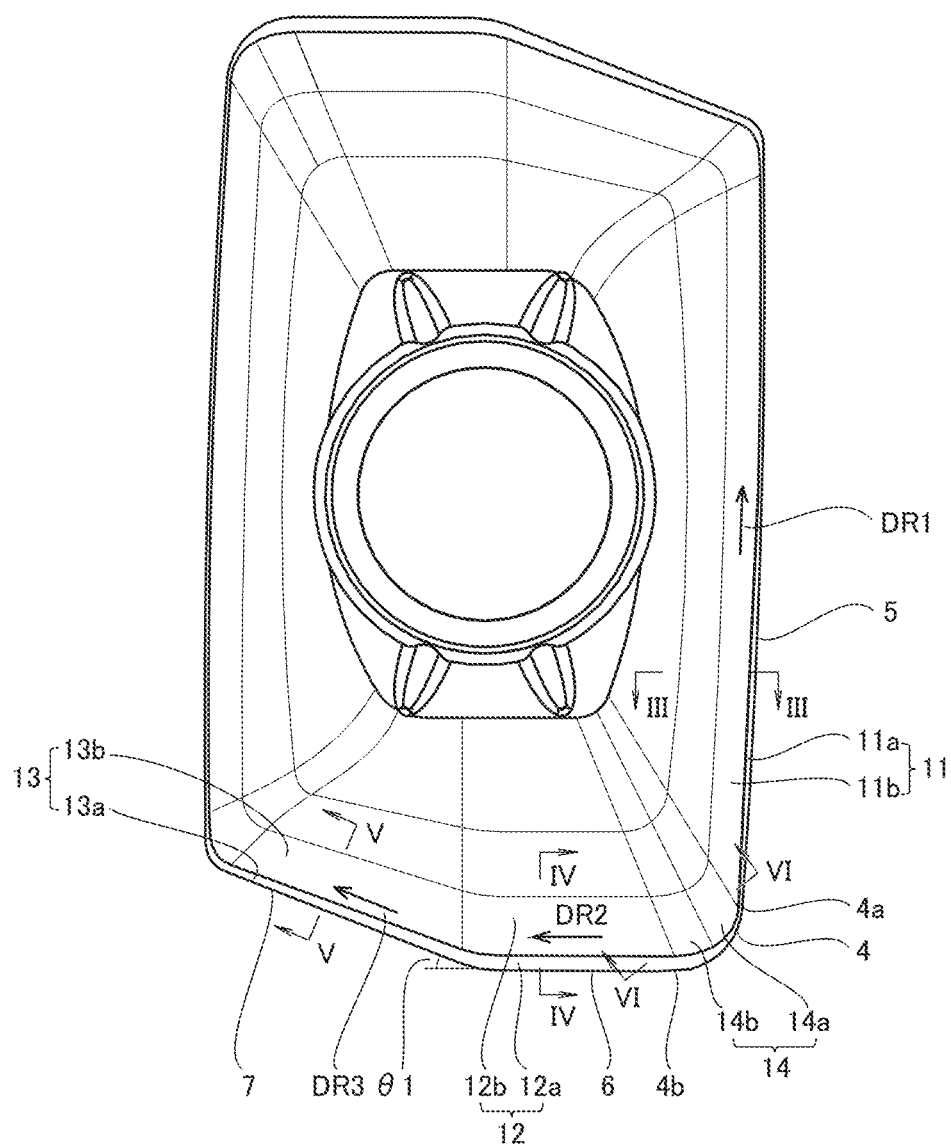
FIG. 2 is a top view of cutting insert 10.

FIG. 2 is a top view of cutting insert 10. As shown in FIG. 2, corner cutting edge 4 has a first end 4a and a second end 4b in the top view. Second end 4b is an end opposite to first end 4a. Corner cutting edge 4 has a curved shape in the top view. This curved shape is convex toward an outside of cutting insert 10. In other words, a virtual straight line connecting first end 4a and second end 4b passes over cutting insert 10 (or top surface 1).

First cutting edge 5 extends from first end 4a in a first direction DR1 in the top view. The first direction DR1 is preferably along the direction of a center axis of rotation A of a body 20 (not shown in FIGS. 1 and 2) to which cutting insert 10 is attached. Second cutting edge 6 extends from second end 4b in a second direction DR2 in the top view. The second direction DR2 intersects the first direction DR1.

Third cutting edge 7 extends from second cutting edge 6 in a third direction DR3 in the top view. The third direction DR3 is a direction that forms an acute angle with the second direction DR2. The second direction DR2 and the third direction DR3 form an angle θ1, which is preferably not less than 5° and not more than 45°. More preferably, the angle θ1 is not less than 15° and not more than 35°.

Top surface 1 has a first rake face 11, a second rake face 12, a third rake face 13, and a fourth rake face 14. First rake face 11 is located adjacent to first cutting edge 5, and second rake face 12 is located adjacent to second cutting edge 6. Third rake face 13 is located adjacent to third cutting edge 7. Fourth rake face 14 is located adjacent to corner cutting edge 4.

In other words, first cutting edge 5 is formed at a ridge line formed by first rake face 11 and side surface 3. Second cutting edge 6 is formed at a ridge line formed by second rake face 12 and side surface 3. Third cutting edge 7 is formed at a ridge line formed by third rake face 13 and side surface 3. Corner cutting edge 4 is formed at a ridge line formed by fourth rake face 14 and side surface 3.

Second rake face 12 is located between third rake face 13 and fourth rake face 14 and is contiguous to third rake face 13 and fourth rake face 14. The fourth rake face is located between first rake face 11 and second rake face 12 and contiguous to first rake face 11 and second rake face 12.

Figure 3:
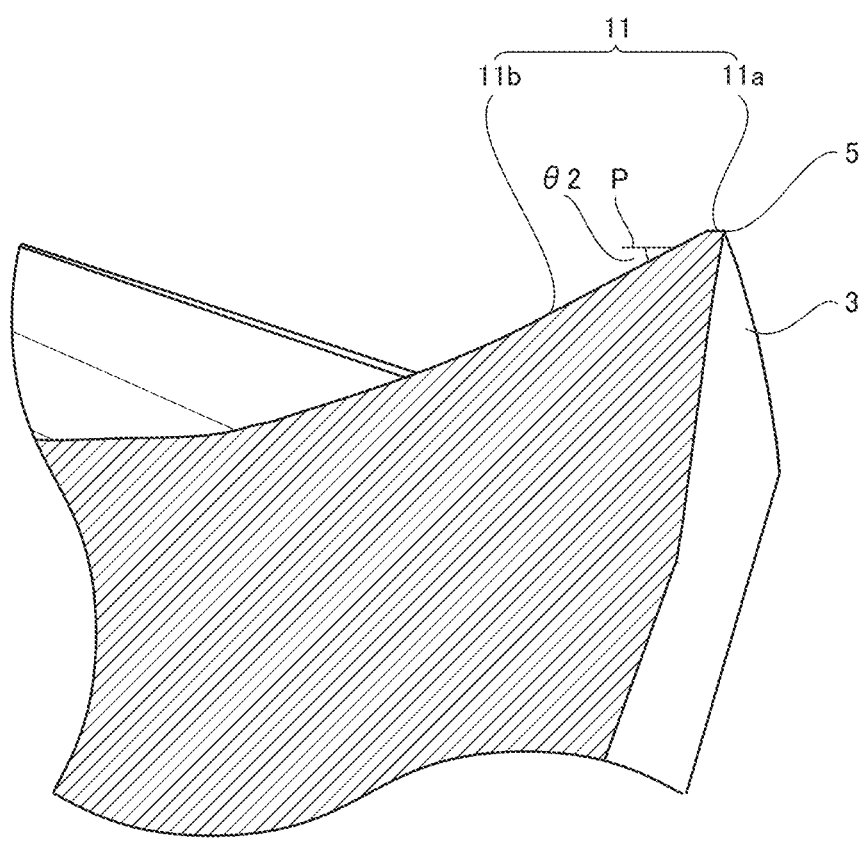
FIG. 3 is a cross section taken along a line in FIG. 2.

FIG. 3 is a cross section taken along a line in FIG. 2. FIG. 3 shows a cross section of cutting insert 10 orthogonal to first cutting edge 5. As shown in FIG. 3, first rake face 11 has a first surface 11a and a second surface 11b. First surface 11a is contiguous to side surface 3. Second surface 11b is contiguous to first surface 11a on a side opposite to first cutting edge 5.

In a direction orthogonal to first cutting edge 5, first surface 11a is smaller in width than second surface 11b. That is, first surface 11a is a land. Note that first rake face 11 may not have first surface 11a. First rake face 11 and bottom surface 2 form an angle θ2 (a first rake angle). The angle θ2 is determined by an angle formed by second surface 11b and a reference plane P parallel to bottom surface 2.

Figure 4:
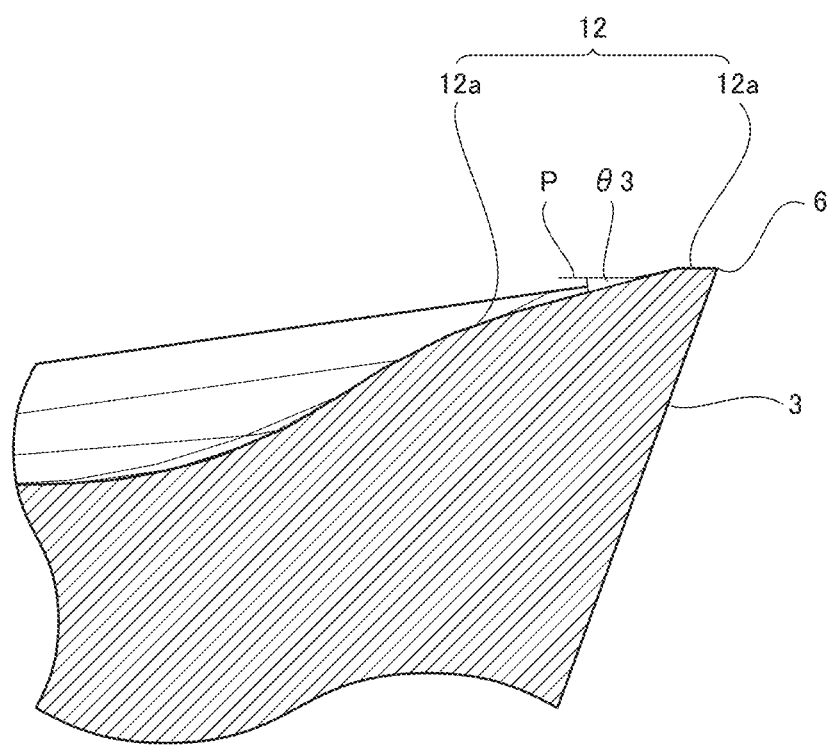
FIG. 4 is a cross section taken along a line IV-IV in FIG. 2.

FIG. 4 is a cross section taken along a line IV-IV in FIG. 2. FIG. 4 shows a cross section of cutting insert 10 orthogonal to second cutting edge 6. As shown in FIG. 4, second rake face 12 has a first surface 12*a* and a second surface 12*b*. First surface 12*a* is contiguous to side surface 3. Second surface 12*b* is contiguous to first surface 12*a* on a side opposite to second cutting edge 6.

In a direction orthogonal to second cutting edge 6, first surface 12*a* is smaller in width than second surface 12*b*. That is, first surface 12*a* is a land. Second rake face 12 may not have first surface 12*a*. Second rake face 12 and bottom surface 2 form an angle θ3 (a second rake angle). The angle θ3 is determined by an angle formed by second surface 12*b* and the reference plane P.

Figure 5:
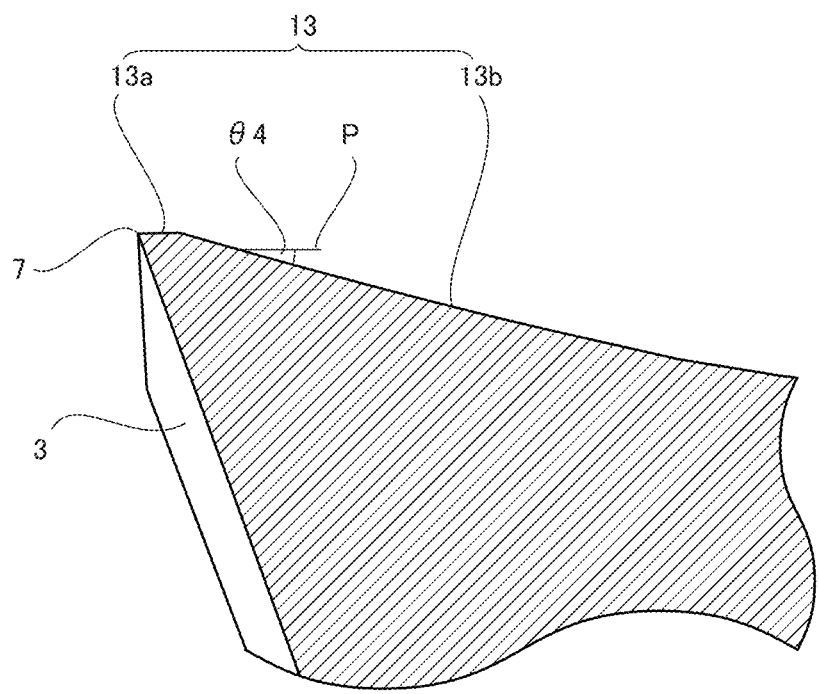
FIG. 5 is a cross section taken along a line V-V in FIG. 2.

FIG. 5 is a cross section taken along a line V-V in FIG. 2. FIG. 5 shows a cross section of cutting insert 10 orthogonal to third cutting edge 7. As shown in FIG. 5, third rake face 13 has a first surface 13*a* and a second surface 13*b*. First surface 13*a* is contiguous to side surface 3, and second surface 13*b* is contiguous to first surface 13*a* on a side opposite to third cutting edge 7.

In a direction orthogonal to third cutting edge 7, first surface 13*a* is smaller in width than second surface 13*b*. That is, first surface 13*a* is a land. Note that third rake face 13 may not have first surface 13*a*. Third rake face 13 and bottom surface 2 form an angle θ4 (a third rake angle). The angle θ4 is determined by an angle formed by second surface 13*b* and the reference plane P.

The angle θ2 is larger than the angle θ4. The angle θ4 is larger than the angle θ3. That is, the angles θ2, θ3, and θ4 satisfy a relationship of angle θ2>angle θ4>angle θ3.

Figure 6:
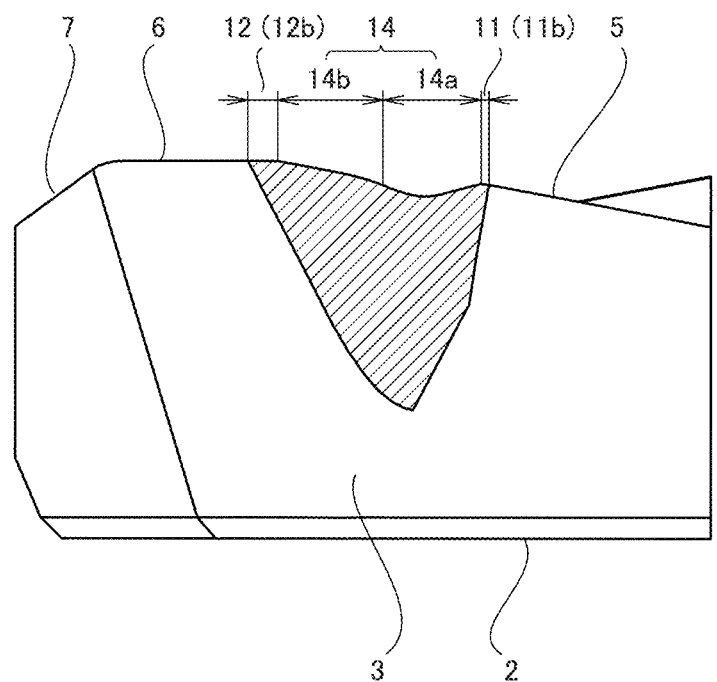
FIG. 6 is a cross section taken along a line VI-VI in FIG. 2.

FIG. 6 is a cross section taken along a line VI-VI in FIG. 2. FIG. 6 shows a cross section transverse to first cutting edge 5 and second cutting edge 6. As shown in FIG. 6, fourth rake face 14 has a first surface 14*a* and a second surface 14*b*. First surface 14*a* is contiguous to first rake face 11. Second surface 14*b* is located between first surface 14*a* and second rake face 12 and contiguous to first surface 14*a* and second rake face 12.

First surface 14*a* has a curved shape concaved in a direction from top surface 1 toward bottom surface 2 in the cross section transverse to first cutting edge 5 and second cutting edge 6 (i.e., convexed downward in FIG. 6). Second surface 14*b* has a curved shape convexed in a direction from bottom surface 2 toward top surface 1 in the cross section transverse to first cutting edge 5 and second cutting edge 6 (i.e., convexed upward in FIG. 6). In other words, the boundary between first surface 14*a* and second surface 14*b* is a point of inflection of the curved shape of fourth rake face 14 in the cross section transverse to first cutting edge 5 and second cutting edge 6.

Fourth rake face 14 has a distance to bottom surface 2 once decreasing as fourth rake face 14 approaches second rake face 12 from the side of first rake face 11. Fourth rake face 14 has a distance to bottom surface 2 increasing as fourth rake face 14 further approaches the second rake face. A distance between fourth rake face 14 and bottom surface 2 at an end on the side of first rake face 11 is smaller than a distance between fourth rake face 14 and bottom surface 2 at an end on the side of second rake face 12.

Figure 7:
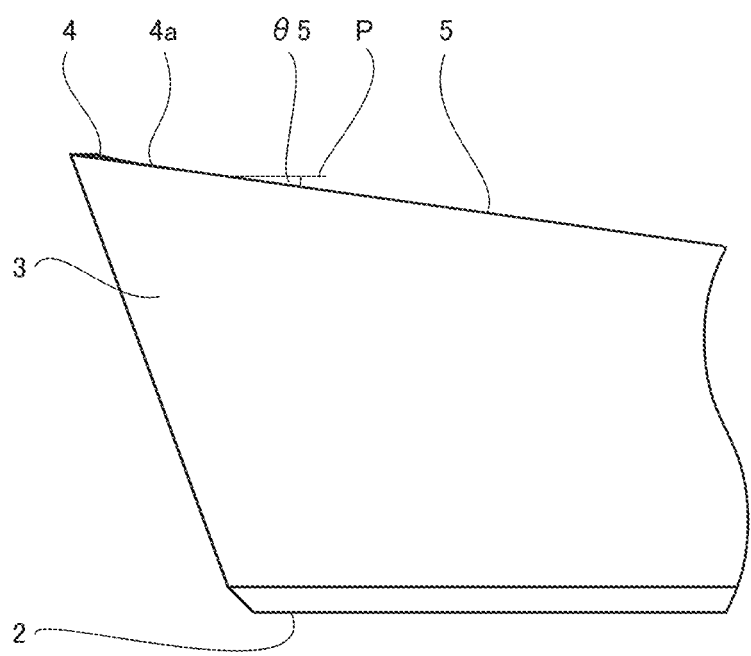
FIG. 7 is a side view of cutting insert 10 as observed in a second direction DR2.

FIG. 7 is a side view of cutting insert 10 as observed in the second direction DR2. As shown in FIG. 7, first cutting edge 5 is inclined so as to approach bottom surface 2 as first cutting edge 5 is farther away from first end 4*a*.

First cutting edge 5 and bottom surface 2 (or reference plane P) form an angle θ5 in a side view as observed in the second direction DR2. The angle θ5 is preferably not less than 2° and not more than 20°. The angle θ5 is more preferably not less than 5° and not more than 15°.

Figure 8:
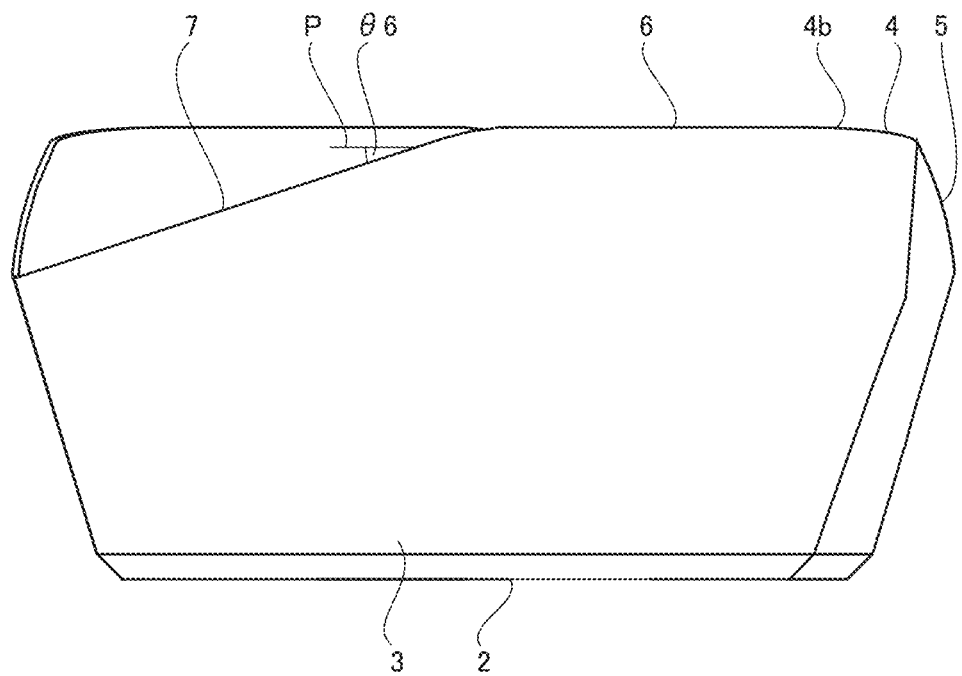
FIG. 8 is a side view of cutting insert 10 as observed in a first direction DR1.

FIG. 8 is a side view of cutting insert 10 as observed in the first direction DR1. As shown in FIG. 8, third cutting edge 7 is inclined so as to approach bottom surface 2 as third cutting edge 7 is farther away from second cutting edge 6.

Third cutting edge 7 and bottom surface 2 (or reference plane P) form an angle θ6 in a side view as observed in the first direction DR1. The angle θ6 is preferably not less than 10° and not more than 40°. The angle θ6 is more preferably not less than 15° and not more than 30°.

Cutting with Cutting Insert According to Embodiment

Hereinafter, a cutting process using cutting insert 10 will be described.

Figure 9:
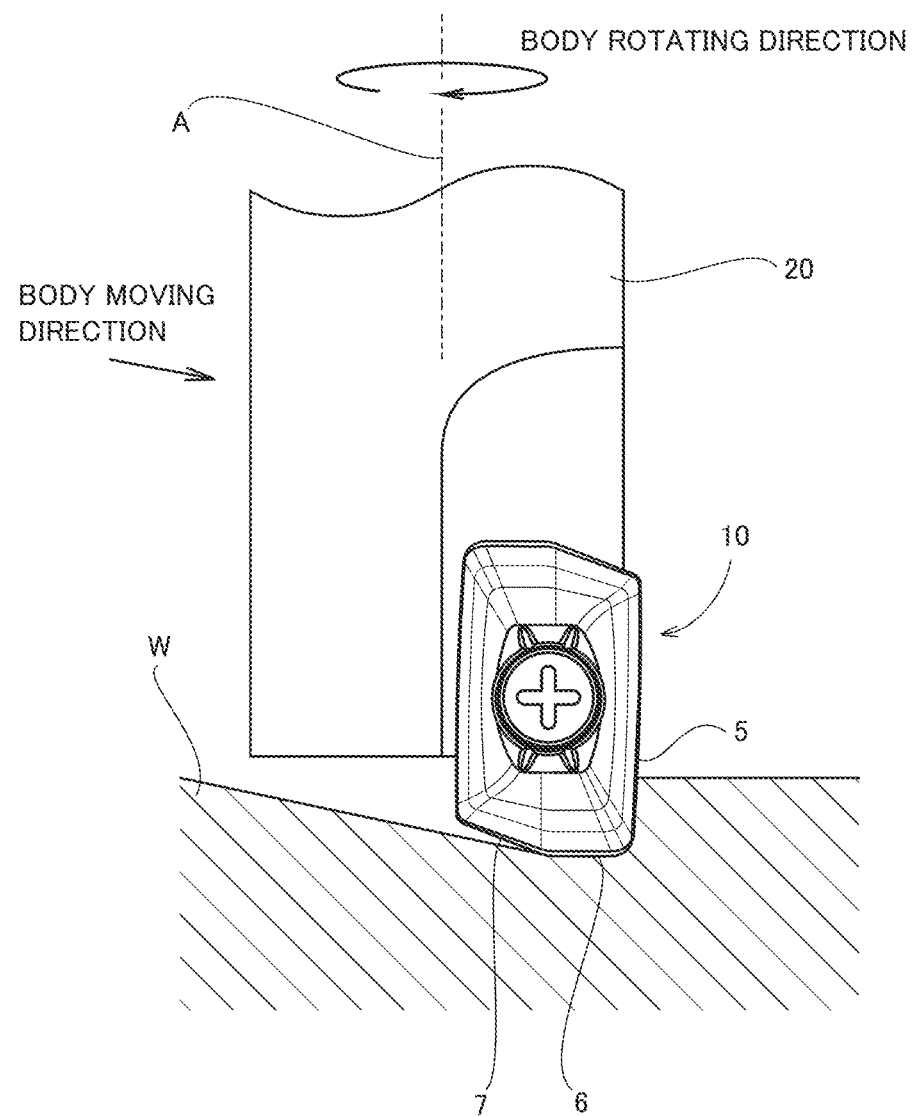
FIG. 9 is a schematic diagram showing a ramping process using cutting insert 10.

FIG. 9 is a schematic diagram showing a ramping process using cutting insert 10. As shown in FIG. 9, cutting insert 10 is attached to body 20. Body 20 is rotated about the center axis of rotation A by a machine tool.

In the ramping process using cutting insert 10, while body 20 is rotated about the center axis of rotation A, body 20 is moved with respect to a workpiece W in the radial direction of body 20 (or rightward in FIG. 9) and the axial direction of body 20 (or downward in FIG. 9). As a result, first cutting edge 5 cuts into a side wall surface of the workpiece W and second cutting edge 6 and third cutting edge 7 cut into a bottom wall surface of the workpiece W to thus perform a ramping process to form in workpiece W a groove having an inclined bottom wall surface.

Effect of Cutting Insert According to Embodiment

Hereinafter, effects of cutting insert 10 will be described.

Cutting insert 10 includes first cutting edge 5 having a rake angle (angle θ2) larger than that of another cutting edge, and accordingly, contact resistance between chips generated by first cutting edge 5 and first rake face 11 is relatively small. Accordingly, the chips generated by first cutting edge 5 are easily ejected to a side opposite to a surface processed by first cutting edge 5, and are thus less likely to be caught between the surface processed by first cutting edge 5 and body 20.

Cutting insert 10 includes third cutting edge 7 having a rake angle (angle θ4) larger than that (angle θ3) of second cutting edge 6, and accordingly, chips generated by third cutting edge 7 receive smaller contact resistance when the chips pass over the third rake face than second rake face 12. Thus, the chips generated by third cutting edge 7 are easily ejected in a direction avoiding second rake face 12. As a result, cutting insert 10 prevents chips generated by third cutting edge 7 from easily tangling with chips generated by another cutting edge.

Cutting insert 10 has first surface 14*a* and second surface 14*b* having a downwardly convex curved shape and an upwardly convex curved shape, respectively, in a cross section, and accordingly, fourth rake face 14 will have a shape raised from the side of first rake face 11 toward the side of second rake face 12. Accordingly, when chips generated by first cutting edge 5 pass over fourth rake face 14, the chips receive large contact resistance. As a result, the chips generated by first cutting edge 5 are easily ejected in a direction avoiding fourth rake face 14, and are less likely to tangle with chips generated by another cutting edge.

When first cutting edge 5 is inclined so as to approach bottom surface 2 as first cutting edge 5 is farther away from first end 4*a*, chips generated by first cutting edge 5 receive smaller contact resistance from first rake face 11 when the chips are ejected in the direction in which first cutting edge 5 is inclined. Therefore, in that case, the chips generated by first cutting edge 5 are further likely to be ejected in the direction avoiding fourth rake face 14, and are further less likely to tangle with chips generated by another cutting edge.

When third cutting edge 7 is inclined so as to approach bottom surface 2 as third cutting edge 7 is farther away from second cutting edge 6, the chips generated by third cutting edge 7 receive smaller contact resistance from third rake face 13 when the chips are ejected in the direction in which third cutting edge 7 is inclined. Therefore, in that case, chips generated by third cutting edge 7 are further likely to be ejected in a direction avoiding second rake face 12, and are further less likely to tangle with chips generated by another cutting edge.

It should be construed that the embodiments disclosed herein are given by way of example in all respects, not by way of limitation. It is intended that the scope of the present invention is defined by claims, rather than the embodiments described above, and encompasses all modifications equivalent in meaning and scope to the claims.

REFERENCE SIGNS LIST 1 top surface 1, 2 bottom surface, 3 side surface, 4 corner cutting edge, 4a first end, 4b second end, 5, first cutting edge, 6 second cutting edge, 7 third cutting edge, 10 cutting insert, 11 first rake face, 11a, 12a, 13a, 14a first surface, 11b, 12b, 13b, 14b second surface, 12 second rake face, 13 third rake face, 14 fourth rake face, 20 body, A center axis of rotation, DR1 first direction, DR2 second direction, DR3 third direction, P reference plane, W workpiece, θ1 angle formed by second direction DR2 and third direction DR3, θ2 first rake angle, θ3 second rake angle, θ3 third rake angle, θ5 angle formed by first cutting edge and bottom surface (or reference plane), θ6 angle formed by third cutting edge and bottom surface (or reference plane).

The invention claimed is:

1. A cutting insert comprising:
    a top surface;
    a bottom surface opposite to the top surface;
    a side surface contiguous to the top surface and the bottom surface; and
    a corner cutting edge, a first cutting edge, a second cutting edge and a third cutting edge formed at a ridge line formed by the side surface and the top surface,
    the corner cutting edge having a first end and a second end opposite to the first end in a top view,
    the first cutting edge extending from the first end in a first direction in the top view,
    the second cutting edge extending from the second end in a second direction intersecting the first direction in the top view,
    the third cutting edge extending from the second cutting edge in a third direction forming an acute angle with the second direction in the top view,
    the top surface having a first rake face located adjacent to the first cutting edge, a second rake face located adjacent to the second cutting edge, and a third rake face located adjacent to the third cutting edge,
    the first, second and third rake faces forming first, second and third rake angles, respectively, with a reference plane parallel to the bottom surface,
    the first rake angle being larger than the third rake angle,
    the third rake angle being larger than the second rake angle,
    the first cutting edge being inclined so as to approach the bottom surface as the first cutting edge is farther away from the first end.

2. The cutting insert according to claim 1, wherein the top surface further has a fourth rake face adjacent to the corner cutting edge.

3. The cutting insert according to claim 2, wherein
    the fourth rake face includes a first surface contiguous to the first rake face, and a second surface contiguous to the first surface and the second rake face,
    in a cross section transverse to the first cutting edge and the second cutting edge, the first surface has a curved shape concaved in a direction from the top surface toward the bottom surface, and
    in the cross section transverse to the first cutting edge and the second cutting edge, the second surface has a curved shape convexed in a direction from the bottom surface toward the top surface.

4. The cutting insert according to claim 1, wherein the second direction and the third direction form an angle of not less than 5° and not more than 45°.

5. The cutting insert according to claim 1, wherein the second direction and the third direction form an angle of not less than 15° and not more than 35°.

6. The cutting insert according to claim 1, wherein the first cutting edge and the reference plane form an angle of not less than 2° and not more than 20° in a side view observed in the second direction.

7. The cutting insert according to claim 1, wherein the first cutting edge and the reference plane form an angle of not less than 5° and not more than 15° in a side view observed in the second direction.

8. The cutting insert according to claim 1, wherein the third cutting edge is inclined so as to approach the bottom surface as the third cutting edge is farther away from the second cutting edge.

9. The cutting insert according to claim 8, wherein the third cutting edge and the reference plane form an angle of not less than 10° and not more than 40° in a side view observed in the first direction.

10. The cutting insert according to claim 8, wherein the third cutting edge and the reference plane form an angle of not less than 15° and not more than 30° in a side view observed in the first direction.

* * * * *